(12) United States Patent
Minoshima et al.

(10) Patent No.: US 10,890,221 B2
(45) Date of Patent: Jan. 12, 2021

(54) DISC BRAKE AND DISC BRAKE FOR RAILWAY VEHICLES

(71) Applicant: AKEBONO BRAKE INDUSTRY CO., LTD., Tokyo (JP)

(72) Inventors: Yuta Minoshima, Tokyo (JP); Toshifumi Maehara, Tokyo (JP); Akihiko Yamazaki, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 287 days.

(21) Appl. No.: 16/089,414

(22) PCT Filed: Mar. 30, 2017

(86) PCT No.: PCT/JP2017/013323
§ 371 (c)(1),
(2) Date: Sep. 28, 2018

(87) PCT Pub. No.: WO2017/170897
PCT Pub. Date: Oct. 5, 2017

(65) Prior Publication Data
US 2020/0300311 A1    Sep. 24, 2020

(30) Foreign Application Priority Data
Mar. 30, 2016 (JP) .................................. 2016-068673

(51) Int. Cl.
*F16D 55/227* (2006.01)
*F16D 65/097* (2006.01)
(Continued)

(52) U.S. Cl.
CPC ....... *F16D 55/227* (2013.01); *F16D 65/0977* (2013.01); *F16D 55/22655* (2013.01);
(Continued)

(58) Field of Classification Search
CPC ............. F16D 55/227; F16D 55/22655; F16D 65/097; F16D 65/0068; F16D 2055/0008;
(Continued)

(56) References Cited

U.S. PATENT DOCUMENTS 9,169,883 B2 * 10/2015 Suzuki .................... F16D 55/34
9,308,924 B2 * 4/2016 Suzuki .................... F16D 65/58
(Continued)

FOREIGN PATENT DOCUMENTS

JP    H04-48438 U    4/1992
JP    H06-32773 U    4/1994
(Continued)

OTHER PUBLICATIONS

International Search Report and Written Opinion dated Jun. 20, 2017 for PCT/JP2017/013323 [non-English language].
(Continued)

*Primary Examiner* — Thomas W Irvin
(74) *Attorney, Agent, or Firm* — Faegre Drinker Biddle & Reath LLP

(57) ABSTRACT

A disc brake (11) includes: a floating caliper (13) including a base portion (25) slidably supported by an upper guide pin (31) supported by a support (23), a piston side pressing arm (39) and an opposite piston side pressing arm (41); a pair of brake pads (17); a drive piston (15) provided on the piston side pressing arm (39); a caliper return mechanism (22) for elastically biasing the base portion disposed on an end portion of the guide pin (31) to the side opposite to the drive piston side; and an inner circumferential side washer (44) disposed on both sides in an axial direction of the rubber ring (21) elastically supporting the upper guide pin (31) in a radial direction to restrict an inner circumferential portion of the rubber ring (21) from bending deformation along an axial direction of the upper guide pin (31).

7 Claims, 12 Drawing Sheets

(51) Int. Cl.
 *F16D 55/2265* (2006.01)
 *F16D 55/00* (2006.01)
(52) U.S. Cl.
 CPC .............. *F16D 2055/007* (2013.01); *F16D 2055/0008* (2013.01); *F16D 2055/0016* (2013.01); *F16D 2055/0041* (2013.01)
(58) Field of Classification Search
 CPC ..... F16D 2055/0016; F16D 2055/0041; F16D 2055/007
 See application file for complete search history.

(56) References Cited

U.S. PATENT DOCUMENTS

| | | | | |
|---|---|---|---|---|
| 9,360,071 | B2 * | 6/2016 | Suzuki | F16D 65/0068 |
| 9,366,300 | B2 * | 6/2016 | Suzuki | F16D 65/0056 |
| 9,382,956 | B2 * | 7/2016 | Suzuki | F16D 65/18 |
| 9,651,106 | B2 * | 5/2017 | Suzuki | F16D 65/54 |
| 9,694,833 | B2 * | 7/2017 | Yamazaki | F16D 55/2245 |
| 2008/0093181 | A1 | 4/2008 | Waag et al. | |
| 2010/0044167 | A1 * | 2/2010 | Suzuki | B61H 5/00 188/72.3 |
| 2014/0216864 | A1 * | 8/2014 | Suzuki | F16D 65/0068 188/72.3 |
| 2014/0299423 | A1 * | 10/2014 | Suzuki | B61H 5/00 188/71.6 |
| 2014/0345982 | A1 * | 11/2014 | Suzuki | F16D 65/0068 188/71.6 |
| 2015/0053510 | A1 * | 2/2015 | Suzuki | F16D 65/18 188/71.6 |
| 2015/0275989 | A1 * | 10/2015 | Suzuki | F16D 65/0056 188/72.4 |
| 2016/0159375 | A1 * | 6/2016 | Yamazaki | F16D 55/226 188/72.3 |

FOREIGN PATENT DOCUMENTS

| | | |
|---|---|---|
| JP | H08-270690 A | 10/1996 |
| JP | H11-263223 A | 9/1999 |
| JP | A-2008-051170 | 3/2008 |

OTHER PUBLICATIONS

International Search Report dated Jun. 20, 2017 for PCT/JP2017/013323, including English translation.
JP Office Action dated Oct. 1, 2019 from corresponding Japanese patent application No. 2016-068673 (with attached English-language translation).

* cited by examiner

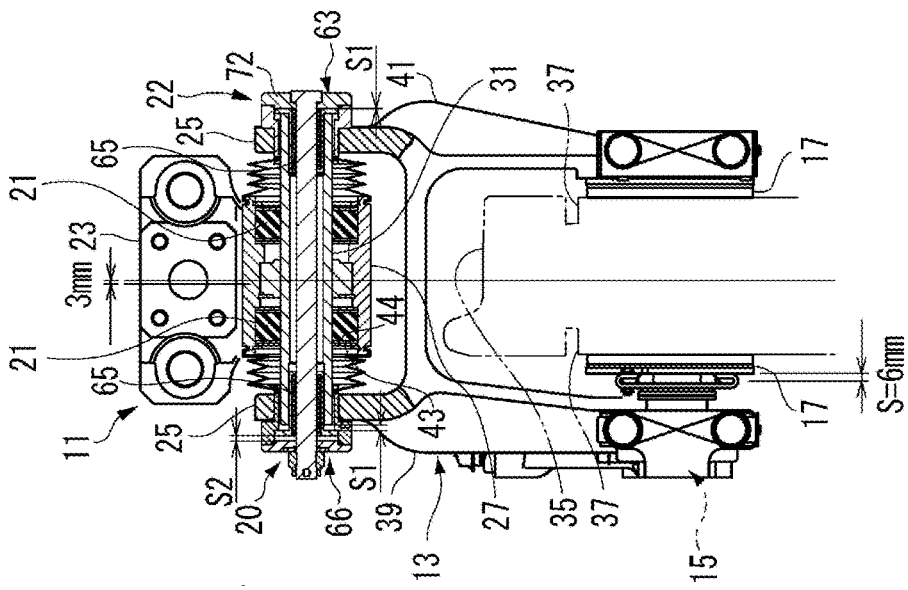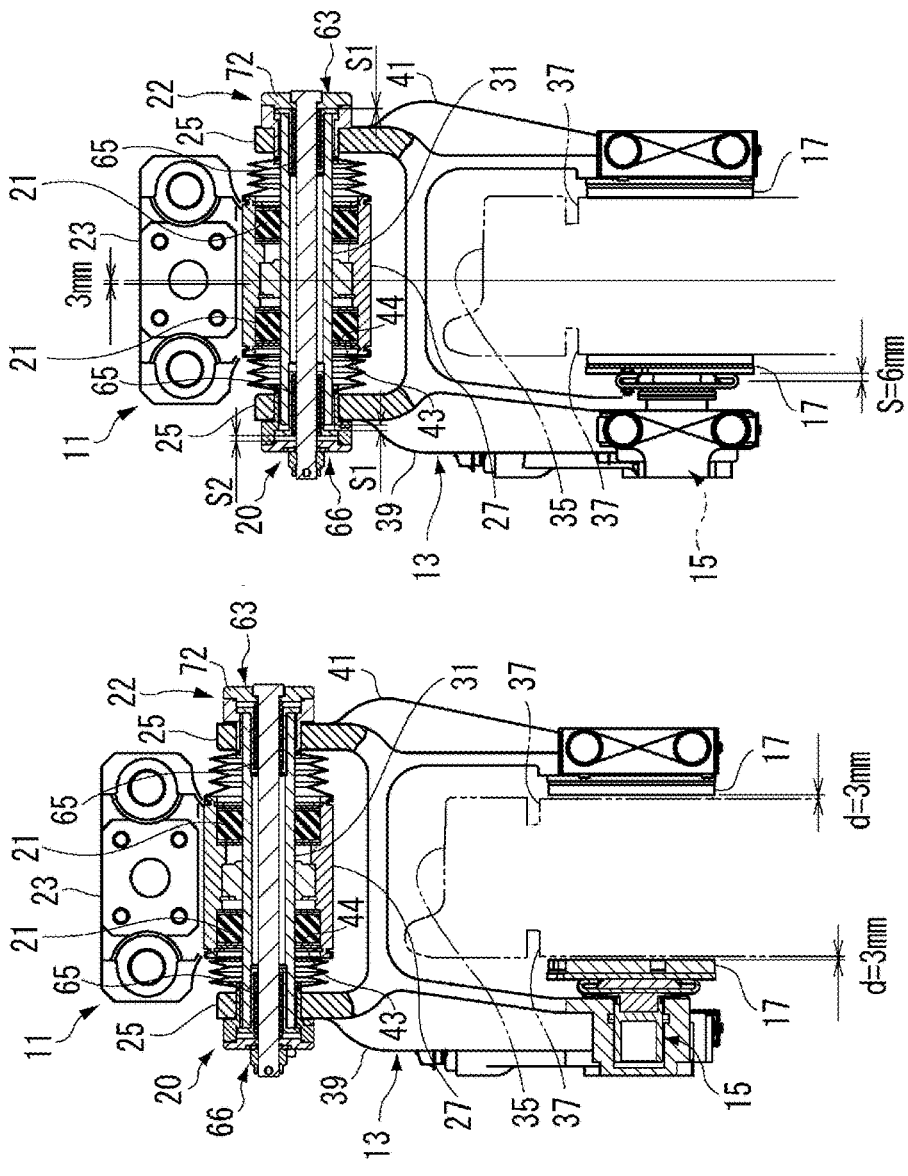

DISC BRAKE AND DISC BRAKE FOR RAILWAY VEHICLES

TECHNICAL FIELD

The present invention relates to a disc brake and a disc brake for a railway vehicle.

BACKGROUND

A floating caliper type disc brake where a dragging phenomenon of a brake pad is prevented is conventionally known (see Patent Document 1).

The floating caliper type disc brake is configured such that one pad (brake pad) is fixed to an arm at one end of a caliper (floating caliper) of which both end portions are bifurcated, and the other pad is pushed out toward a rotor by a piston (drive piston) provided on an arm opposite thereto. Two guide pins are fixed to an arm at the other end of the caliper, and the guide pins are supported slidably in an axial direction by a cylindrical portion of a support coupled to a truck frame or the like.

That is, as shown in FIG. 12A, a pair of upper and lower guide pins 503 (only the upper side is shown) is bridged between a pair of arms 501 which are two bifurcations of the caliper, and are fixed to the arms 501 by a flange 505 and a nut (not shown), respectively. On an inner surface of a cylindrical portion 507 of a support (not shown) surrounding the upper guide pin 503, a pair of retaining rings 509 is sandwiched and attached by a step portion 511 and a snap ring (not shown). A retraction rubber ring 513 having an H-shaped cross-section is fitted inside the retaining ring 509.

In the above configuration, at the time of non-braking, a tip end portion of a protrusion 515 in an inner circumference of the retraction rubber ring 513 having an H-shaped cross-section abuts an outer circumferential surface of the guide pin 503 straightly as shown in FIG. 12A.

When braking, the guide pin 503 moves together with the caliper in a direction of an arrow (A) in FIG. 12A with reaction force the pad is pressed against a rotor. At the same time, due to friction between the outer circumferential surface of the guide pin and the tip end portion of the protrusion 515, the protrusion 515 of the retraction rubber ring 513 bends (flexes) in the direction of the arrow (A).

When the braking is released, the retraction rubber ring 513 returns to an original state due to elastic force thereof, and the guide pin 503 is moved in a direction of an arrow (B) in FIG. 12C due to the friction between the outer circumferential surface of the guide pin 503 and the tip end portion of the protrusion 515 in the inner circumference. Accordingly, the caliper coupled to the guide pin 503 slightly moves in the direction of the arrow (B), and the pad fixed to the caliper is slightly separated from the rotor. Therefore, starting of a vehicle can be smooth. When a vehicle starts traveling, a gap between the pad and the rotor is sufficiently large due to vibration or the like.

According to such a floating caliper type disc brake, the pad fixed to the caliper immediately when the braking is released can be separated from the rotor by the retraction rubber ring 513, can prevent an increase in starting torque, and can prevent abrasion of a lining.

PRIOR ART DOCUMENT

Patent Document

Patent Document 1: Japan Utility Model Publication No. 6-32773

SUMMARY OF THE INVENTION

Problems to be Solved by the Invention

However, since the conventional floating caliper type disc brake described above manages a retraction effect (return force) and a return amount of the caliper only by the retraction rubber ring 513, there was a problem that it is difficult to stably exert a desired caliper return operation due to manufacture variations, dimensional tolerance, or the like of the retraction rubber ring 513. That is, there is a limit to obtain return force only by the retraction rubber ring 513. In addition, since fine adjustment of the return amount is required for the caliper having different specifications, a structure is desired where the return amount can be finely adjusted without additional processing on the existing caliper (casting).

The present invention has been made in view of the above circumstances, and an object thereof is to provide a disc brake and a disc brake for a railway vehicle where caliper return force is set easily, and desired caliper return operation is exhibited stably, so that dragging of a pad can be prevented certainly.

Means for Solving the Problems

The above object according to the present invention is achieved by the following configuration.

(1) A disc brake including:
a floating caliper including a base portion which is slidably supported to a cylindrical support portion of a support by a guide pin and a pair of pressing arms which are extended from the base portion to a position where a disc rotor is interposed between both sides in an axial direction;
a pair of brake pads provided at tip end portions of the pair of pressing arms respectively so as to face a side surface of the disc rotor;
a drive piston provided on one of the pair of pressing arms to drive one of the brake pads toward the side surface of the disc rotor;
a caliper return mechanism, disposed on at least an end portion on a side opposite to the drive piston side at two end portions of the guide pin, and configured to elastically bias the base portion slidably supported by the guide pin toward the side opposite to the drive piston side;
a rubber ring fitted inside the cylindrical support portion and elastically supporting the guide pin in a radial direction; and
an inner circumferential side washer disposed on at least the drive piston side of both sides of the rubber ring in an axial direction and inserted into the guide pin, so as to restrict an inner circumferential portion of the rubber ring from bending deformation along an axial direction of the guide pin.

According to the disc brake of having a configuration of the above (1), a caliper return mechanism is provided at an end portion on the side opposite to the drive piston side of the guide pin that slidably supports the base portion of the floating caliper with respect to the cylindrical support portion of the support. The caliper return mechanism generates caliper return force between the guide pin and the floating caliper. Therefore, the caliper return mechanism separates the pair of pads from the disc rotor with the same clearance as before braking by the caliper return force when braking is released. The guide pin provided with the caliper return mechanism needs only to be exchanged with the guide pin in the current floating caliper, and it is possible to improve a pad dragging measure against the disc brake without any additional processing on the existing floating caliper.

Further, the rubber ring that is inserted into the inside of the cylindrical support portion and elastically supports the guide pin in the radial direction, the inner circumferential portion is restricted from bending deformation along the axial direction of the guide pin by an inner circumferential side washer disposed on at least the drive piston side on two sides in the axial direction of the rubber ring. Therefore, in the rubber ring, as the conventional traction rubber ring, the inner circumferential portion of the rubber ring is not bent and deformed along the axial direction of the guide pin due to movement of the guide pin during braking, and the guide pin is not moved in the axial direction due to elastic restoring force.

Therefore, the caliper return mechanism can stably generate the caliper return force without being affected by variations of the frictional resistance of the rubber ring that elastically supports the guide pin in the radial direction.

(2) The disc brake according to the above (1), wherein an outer circumferential side washer fixed to an inner circumferential surface of the cylindrical support portion abuts on a surface opposite to a surface of the inner circumferential side washer which is in contact with the rubber ring, so as to restrict movement of the inner circumferential side washer along the axial direction of the guide pin.

According to the disc brake having a configuration of the above (2), the inner circumferential side washer inserted into the guide pin is positioned with respect to the axial direction of the guide pin by the outer circumferential side washer fixed to the inner circumferential surface of the cylindrical support portion. The inner circumferential side washer inserted into the guide pin has a clearance with respect to the inner circumferential surface of the cylindrical support portion, and the outer circumferential side washer fixed to the inner circumferential surface of the cylindrical support portion has a clearance with respect to the outer circumferential surface of the guide pin. Therefore, the inner circumferential side washer positioned in the axial direction by the outer circumferential side washer can follow movement of the guide pin in the radial direction since slip occurs at a surface contact portion with the outer circumferential side washer.

(3) The disc brake according to the above (1) or (2), wherein an inner circumferential end of the inner circumferential side washer includes a cylindrical extension portion extending along an inner circumferential surface of the rubber ring.

According to the disc brake having a configuration of the above (3), the inner circumferential side washer is fitted to the inner circumferential surface of the rubber ring by the extension portion and is positioned in advance. Therefore, it is not necessary to perform positioning when the guide pin is assembled to the cylindrical support portion of the support, and an assembly property is excellent.

The cylindrical extension portion is formed by bending an inner circumferential end of the annular inner circumferential side washer into an L-shaped cross section by burring or the like. Therefore, when the inner circumferential side washer is inserted into the guide pin, since the inlet of the inner circumferential side washer has a bent R portion rather than an edge, the guide pin can be smoothly inserted without being caught by the inner circumferential side washer.

The disc brake according to any one of claims 1 to 3, wherein a fitting member interposed between the guide pins is disposed on the inner circumferential surface of the rubber ring.

According to the disc brake having a configuration of the above (4), sliding resistance of the guide pin with respect to the rubber ring is stabilized by interposing the fitting member between the guide pin and the inner circumferential surface of the rubber ring, the width of axial force fluctuation decreases when the guide pin slides, and the caliper return force of the caliper return mechanism is stabilized.

Further, since the rubber ring is not in contact with the guide pin, the guide pin adheres to the rubber ring, and tearing of the rubber ring due to adherence does not occur.

(5) The disc brake according to claim 4, wherein the fitting member is a cylindrical member including a slot, and is fitted along the inner circumferential surface of the rubber ring in a state of being elastically deformed in a diameter reduction direction.

According to the disc brake having a configuration of the above (5), the fitting member inserted into the inner circumferential surface of the rubber ring can be fitted with the guide pin and interference. Therefore, the sliding resistance of the guide pin with respect to the rubber ring is more stable.

(6) The disc brake according to any one of the above (1) to (5), wherein the inner circumferential side washer is disposed on both sides of the rubber ring in the axial direction.

According to the disc brake having a configuration of the above (6), since the inner circumferential side washer is disposed on both sides in the axial direction of the rubber ring, not only bending deformation of the rubber ring due to movement of the guide pin during braking, but bending deformation of the rubber ring due to movement of the guide pin in an opposite direction when the floating caliper is moved due to oscillation of the disc rotor, for example, can also be restricted.

(7) A disc brake for a railway vehicle including the disc brake according to any one of the above (1) to (6).

According to the disc brake for a railway vehicle having a configuration of the above (7), the brake pad and a pad clearance of the disc rotor can be maintained constant when the brake pad is pressed and braked to the disc rotor mounted on both side surfaces of a wheel of the railway vehicle. Accordingly, it is possible to prevent uneven wear and drag of the brake pad and to suppress an increase in starting torque of the vehicle.

Effect of the Invention

According to the disc brake and the disc brake for a railway vehicle of the present invention, caliper return force is set easily, and desired caliper return operation is exhibited stably, so that dragging of a pad can be prevented certainly.

The present invention has been briefly described above. Further, details of the present invention will be clarified by reading a mode (hereinafter, referred to as "embodiment") for carrying out the invention described below with reference to attached drawings.

BRIEF DESCRIPTION OF DRAWINGS

FIGS. 5A to 5C are operation explanatory views of the disc brake shown in FIG. 1. FIG. 5A is an operation explanatory view of at the initial time, FIG. 5B is an operation explanatory view at the time of brake braking, and FIG. 5C is an operation explanatory view at the time of brake slow release.

DESCRIPTION OF EMBODIMENTS

Figure 1:
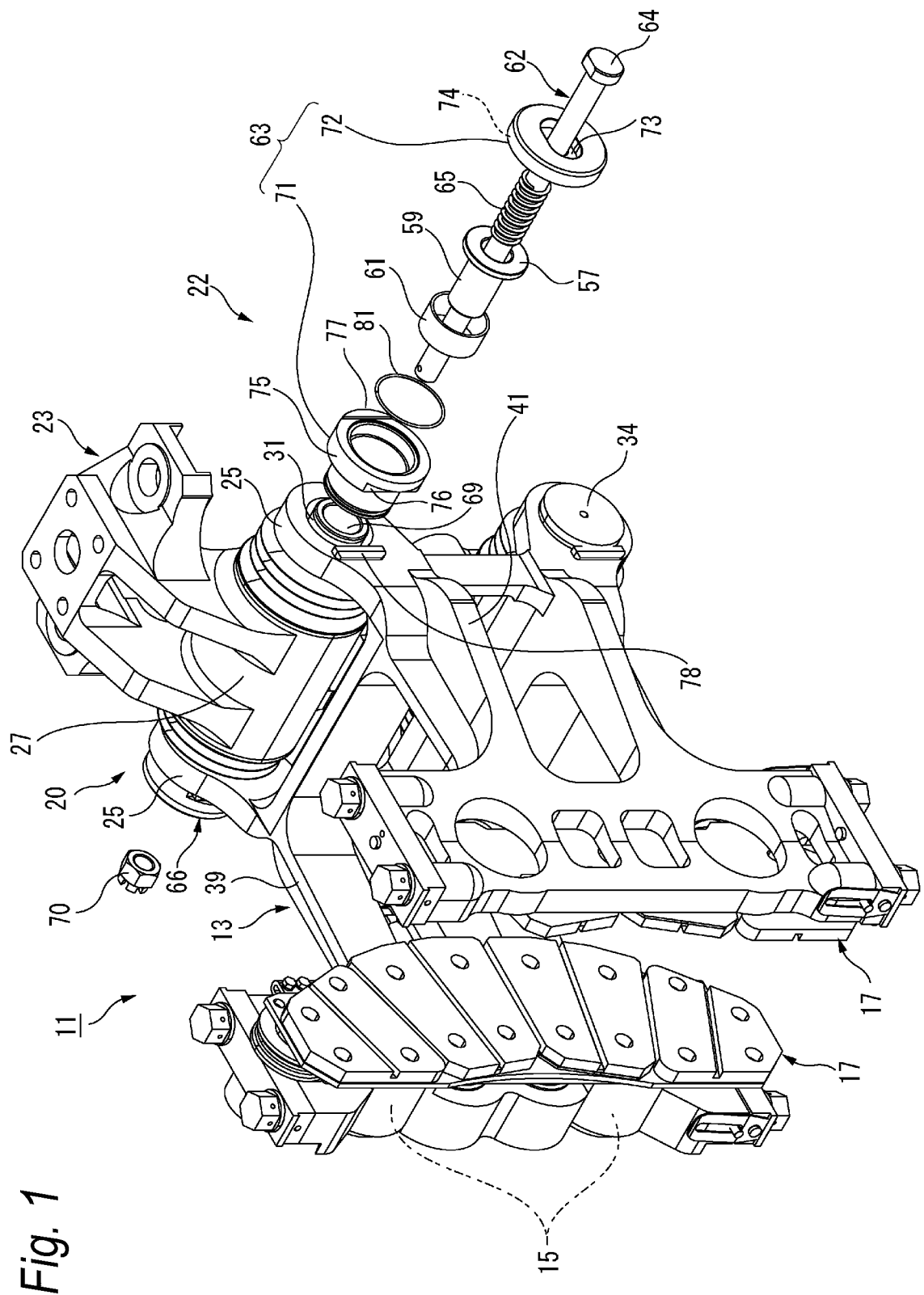
FIG. 1 is an exploded perspective view of a disc brake according to a first embodiment of the present invention.

Hereinafter, embodiments of the present invention will be described with reference to the drawings.

As shown in FIGS. 1 to 4, a floating caliper type disc brake 11 according to a first embodiment of the present invention used as a disc brake for a railway vehicle is described as an example. In addition, the disc brake 11 can also be suitably used as a brake device of various industrial drive devices that generates braking force on a rotating member, such as an elevator.

The floating caliper type disc brake 11 according to the first embodiment includes the following as main components: a floating caliper 13 including a piston side pressing arm 39 and an opposite piston side pressing arm 41 which is a pair of pressing arms extended to a position where disc rotors 37, 37 are interposed between both sides in an axial direction, the disc rotors 37, 37 being attached to both sides of a wheel 35 (see FIGS. 5A to 5C) from base portions 25 supported slidably by a support 23 coupled to a truck frame (not shown); a pair of brake pads 17, 17 provided on the piston side pressing arm 39 and the opposite piston side pressing arm 41 respectively to face outer sides of the disc rotors 37, 37, a drive piston 15 (see a partial breaking portion in FIG. 5A) provided on the piston side pressing arm 39, and caliper return mechanisms 20, 22 arranged at both end portions of an upper guide pin (guide pin) 31. The upper guide pin 31 is formed as a hollow pipe.

On an upper portion and a lower portion of the base portion 25 in the floating caliper 13, an upper guide pin 31 and a lower guide pin 33 as guide pins are bridged on an upper cylindrical support portion 27 and a lower cylindrical support portion 29 which are a pair of upper and lower cylindrical support portions of the support 23, respectively. The base portions 25 of the floating caliper 13 are slidably supported by the upper cylindrical support portion 27 and the lower cylindrical support portion 29 through the upper guide pin 31 and the lower guide pin 33. Both ends of the upper guide pin 31 are prevented from slipping out of the base portion 25 by the caliper return mechanisms 20, 22. The lower guide pin 33 is fixed to the base portion 25 by a flange 34 and a nut 36. In the base portion 25 of the floating caliper 13, the piston side pressing arm 39 and the opposite piston side pressing arm 39 as a pair of pressing arms is extended to positions where the disc rotors 37 attached to both sides of the wheel 35 (see FIGS. 5A to 5C) are interposed between both sides in the axial direction. Incidentally, the piston side pressing arm 39 and the opposite piston side pressing arm 41 in the first embodiment are parallel bifurcated arms.

The brake pads 17 are provided at tip end portions of the piston side pressing arm 39 and the opposite piston side pressing arm 41 respectively so as to face the outer sides of the disc rotors 37 attached to both sides of the wheel 35. In the first embodiment, a structure in which lining surfaces of the brake pads 17 presses the disc rotors 37 to perform brake operation is described as an example. Of course, the disc brake 11 may be configured to compress both sides of the wheel 35 directly and brake.

In the first embodiment, the drive piston 15 is provided on the piston side pressing arm 39 which is one of a pair of pressing arms for driving one of the brake pads 17 toward a side of the disc rotor 37.

In the first embodiment, the caliper return mechanisms 20, 22 are arranged at both end portions of the upper guide pin 31. The caliper return mechanism 20 elastically biases the base portion 25 slidably supported by the upper guide pin 31 toward the drive piston side, and the caliper return mechanism 22 elastically biases the base portion 25 toward a side opposite to a drive piston side. The caliper return mechanism according to the present invention may be provided on at least an end portion (left end portion in FIG. 3) on a side opposite to the drive piston side at two end portions of the upper guide pin 31 as the caliper return mechanism 22. Although an example in which the caliper return mechanisms 20, 22 are only provided on the upper guide pin 31 is described in the first embodiment, the caliper return mechanisms 20, 22 may be provided on both the upper guide pin 31 and the lower guide pin 33.

The caliper return mechanism 20 according to the first embodiment includes a spring housing member 59 mounted on a spring housing portion 69 provided at a piston side end opening portion (end portion) 38 of the hollow upper guide pin 31, a slide bearing 61 for slidably supporting the base portion 25 with respect to the upper guide pin 31, a spring receiving member 66 covering the opening of the upper guide pin 31 which is the spring housing portion 69, and a compression spring member 65 interposed between the spring receiving member 66 and a bottom portion 58 of the spring housing member 59.

The spring housing member 59 is formed in a bottomed cylindrical shape, and includes an opening end flange 57 on an opening end side.

On the other hand, the caliper return mechanism 22 includes a spring housing member 59 mounted on a spring housing portion 69 provided at an opposite piston side end opening portion (end portion) 32 of the hollow upper guide pin 31, a slide bearing 61 for slidably supporting a base portion 25 with respect to the upper guide pin 31, a spring receiving member 63 covering the opening of the upper guide pin 31 which is the spring housing portion 69, and a compression spring member 65 interposed between the spring receiving member 63 and a bottom portion 58 of the spring housing member 59.

The spring housing members 59 are mounted on respective spring housing portions 69 recessed at the piston side end opening portion 38 of the upper guide pin 31 and the opposite piston side end opening portion (end portion) 32 of the upper guide pin 31. In the spring housing member 59 mounted on the spring housing portion 69, the opening end flange 57 is locked to an opening edge of the spring housing portion 69, and further insertion into the spring housing portion 69 is restricted. In the first embodiment, although an example in which a compression coil spring is used as the compression spring member 65 is described, the compression spring member 65 may be an elastic member such as rubber.

The slide bearings 61 are formed in a cylindrical shape, are fitted into guide pin supporting portions 71 of the spring receiving members 63, 66, and are disposed between the upper guide pin 31 and the spring receiving members 63, 66. The slide bearing 61 reduces sliding resistance of the base portion 25 with respect to the upper guide pin 31. Therefore, the spring receiving members 63, 66 are slidably inserted out of outer circumference sides of both ends of the upper guide pin 31.

The spring receiving member 66 includes a cylindrical guide pin support portion 71 and an annular spring support portion 68. In addition, the spring receiving member 63 includes a cylindrical guide pin support portion 71 and an annular spring support portion 72.

The guide pin support portion 71 is formed in a cylindrical shape and is fixed to the base portion 25 so as to slidably support the upper guide pin 31 via the slide bearing 61. Besides, between the guide pin support portion 71 and the base portion 25, a rotation-stop mechanism is provided which restricts relative rotation of each other since a notch portion 76 of a flange portion 75 engages with a locking rib 78 of the base portion 25.

The spring support portion 68 and the spring support portion 72 are fixed to the base portions 25 together with the guide pin support portions 71 by a bolt shaft 62 penetrating an opening 56 on the bottom portion 58 of the spring housing member 59 and the hollow upper guide pin 31 in a central axis direction and a nut 70 screwed to a tip end of the bolt shaft 62 so as to cover outer opening ends of the guide pin support portions 71 in a state of being abutted on one end of the compression spring member 65, respectively. Thus, the spring receiving members 63, 66 are integrally fixed to the base portions 25. The spring receiving members 63, 66 integrally fixed to the base portions 25 are slidable on the upper guide pin 31 via the slide bearing 61. That is, the base portions 25 are slidably supported to the upper guide pin 31 via the spring receiving members 63, 66.

The spring support portions 72, 68 can be removed and the compression spring members 65 can be attached and detached while the guide pin support portions 71 of the spring receiving members 63, 66 fixed to the base portions 25 of the floating caliper 13 are slidably supported by the outer circumference of the upper guide pin 31. Accordingly, return force and a return amount of the floating caliper 13 can be adjusted extremely easily by exchanging the spring support portions 72, 68 or the compression spring members 65 having different specifications (predetermined space S1, spring constant, and the like).

In the caliper return mechanism 20, an O-ring 80 is mounted between a washer 84 fastened by the nut 70 and the spring support portion 68, and an O-ring 81 is mounted between the spring support portion 68 and the flange portion 75 of the guide pin support portion 71. In the caliper return mechanism 22, an O-ring 82 is mounted between the bolt head 64 of the bolt shaft 62 and the spring support portion 72, and an O-ring 81 is mounted between the spring support portion 72 and the flange portion 75 of the guide pin support portion 71. The O-rings 80, 82 water-tightly seal penetration holes of the spring support portions 68, 72 through which the bolt shaft 62 penetrates, respectively, and the O-ring 81 water-tightly seals a fitted portion between the guide pin support portions 71 and the spring support portions 68, 72, thereby preventing water or dust from penetrating into the spring housing portion 69 and the spring housing member 59.

Besides, between the guide pin support portion 71 and the spring support portion 25, the rotation-stop mechanism is provided which restricts relative rotation of each other since a notch portion 74 of the spring support portion 72 engages with a locking protrusion 77 the flange portion 75. In addition, a bolt head 64 having a width across flat is fitted in a fitting recessed portion 73 of the spring support portion 72, thus the rotation-stop mechanism restricting relative rotation of each other is provided between the spring support portion 72 and the bolt shaft 62. Therefore, when the nut 70 is screwed to the tip end of the bolt shaft 62, the bolt shaft 62 does not idle and assembly workability is improved.

Figure 2:
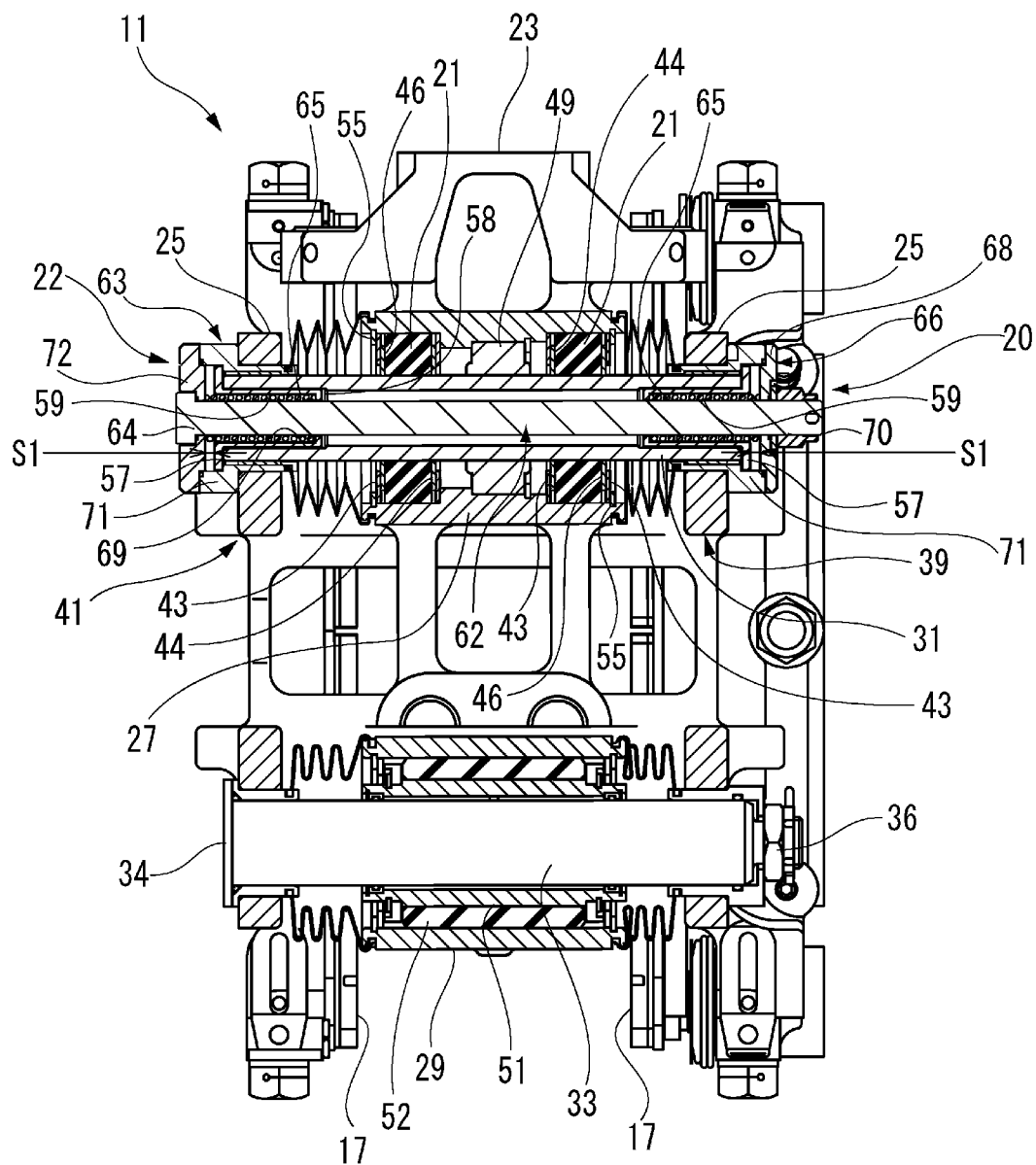
FIG. 2 is a vertical cross-sectional view of the disc brake shown in FIG. 1.
Figure 3:
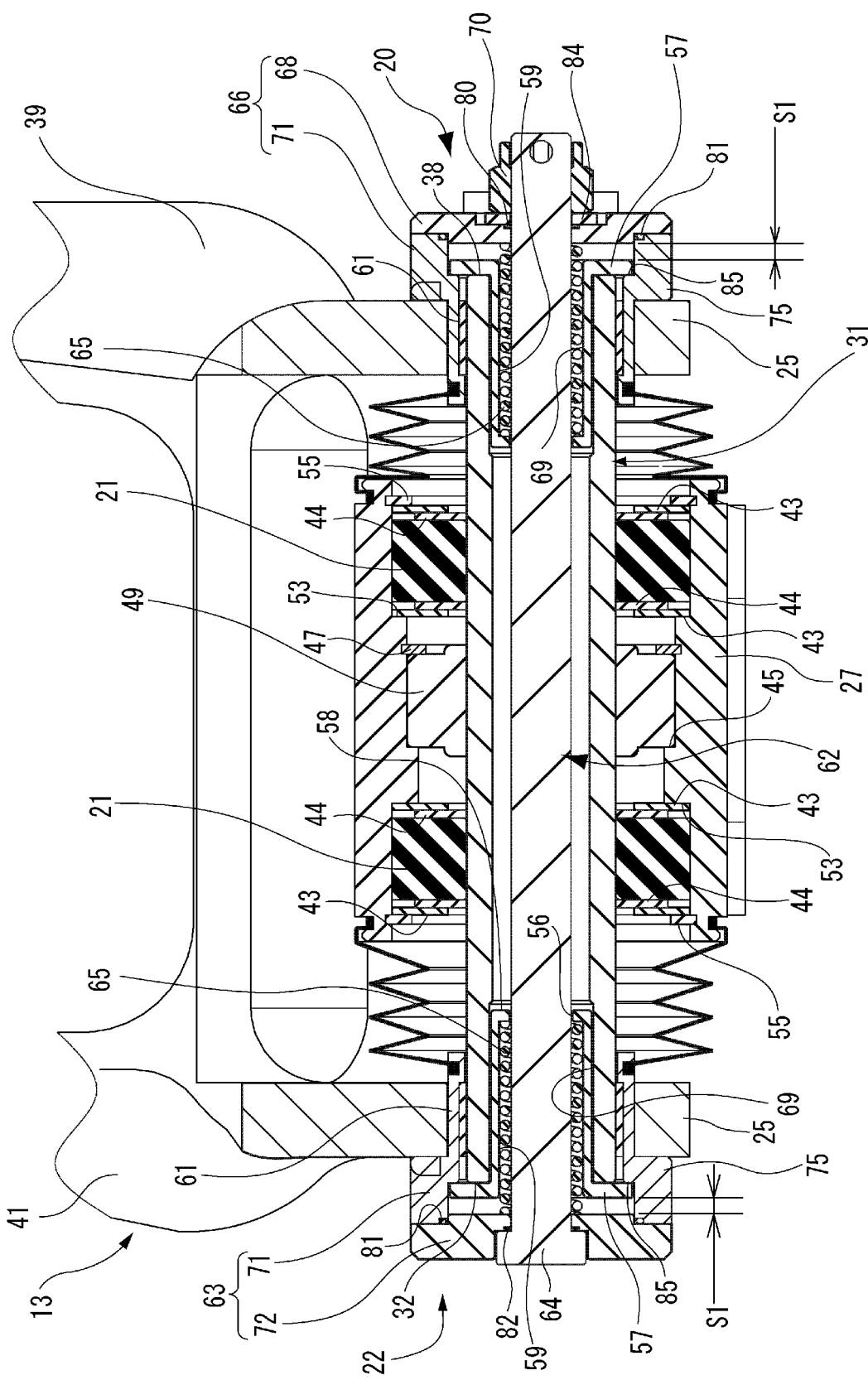
FIG. 3 is a horizontal cross-sectional view of main portions of the disc brake shown in FIG. 1.

As shown in FIGS. 2 and 3, the compression spring member 65 is housed inside the spring housing member 59. One end of the compression spring member 65 housed in each spring housing member 59 abuts on the bottom portion 58 of the spring housing member 59, and the other end abuts on the spring support portion 72 of the spring receiving member 63 (or the spring support portion 68 of the spring receiving member 66). Also, each of the compression spring members 65 is interposed between the spring receiving member 66 (or the spring receiving member 63) and the bottom portion 58 of the spring housing member 59 in a state of having the predetermined space S1 with respect to an opening end flange 57 of the spring housing member 59.

In addition, the caliper return mechanisms 20, 22 include a stopper portion 85 (see FIG. 3). The stopper portion 85 is formed in a stepped shape on the inner circumference of the guide pin support portion 71. The stopper portion 85 abuts on the opening end flange 57 of the spring housing member 59, thereby restricting movement of the spring housing member 59 in the axial direction with respect to the base portion 25 via the guide pin support portion 71 in the predetermined space S1. That is, the movement of the spring housing member 59 in the caliper return mechanisms 20, 22 is restricted in the predetermined space S1 by the stopper portion 85 of the guide pin support portion 71 in the spring receiving member 66 (or the spring receiving member 63). Therefore, during braking, a gap (interference avoiding gap) S2 shown in FIG. 5B is formed between the opening end flange 57 of the spring housing member 59 and the piston side end opening portion 38 of the upper guide pin 31 in the caliper return mechanism 20 on the drive piston side by the movement of the floating caliper 13 toward the drive piston side.

Figure 4:
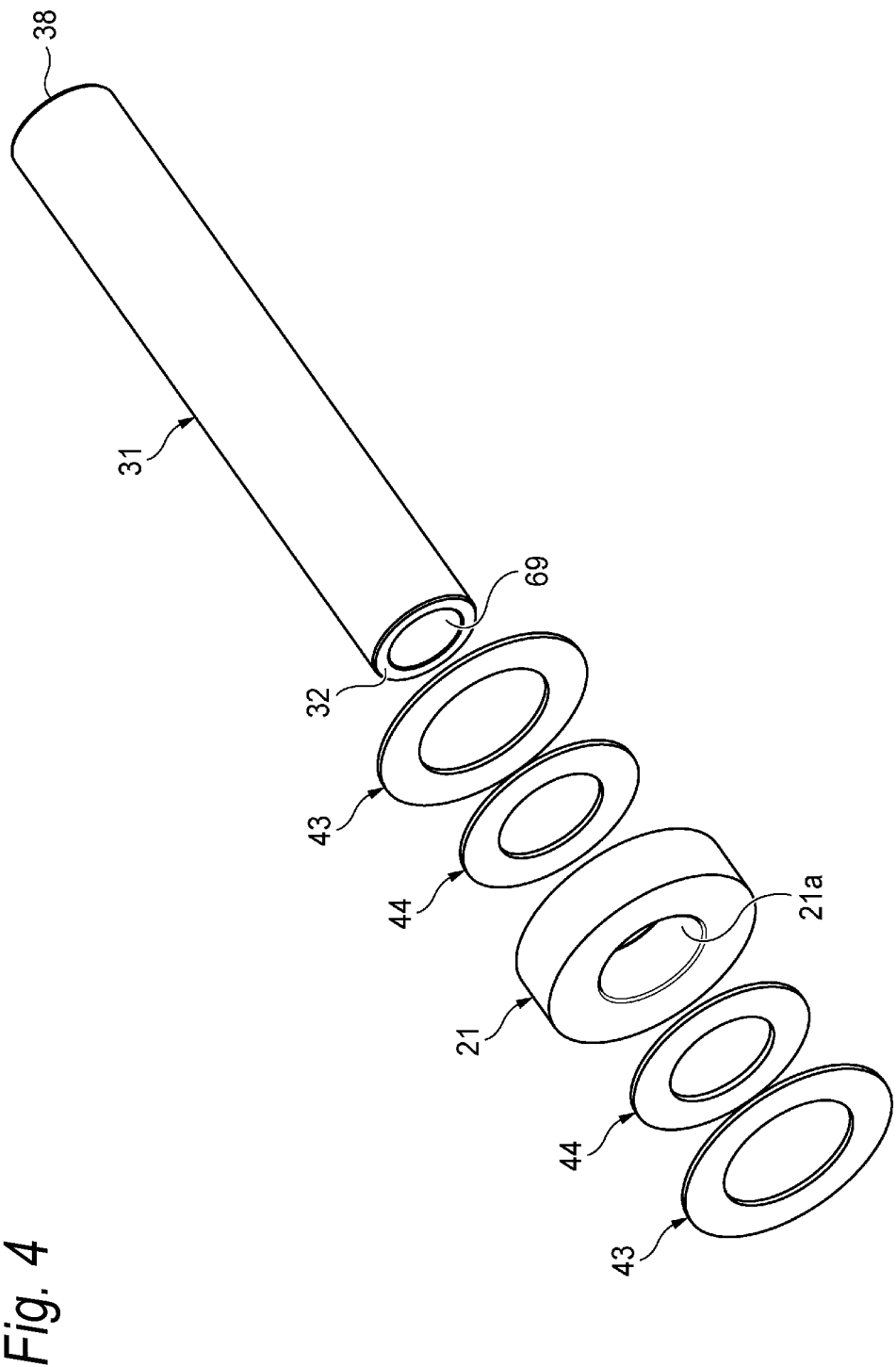
FIG. 4 is an exploded perspective view of an inner circumferential side washer and a rubber ring inserted into a guide pin shown in FIG. 3.

A pair of rubber rings elastically supporting the upper guide pin 31 in the radial direction is fitted inside the upper cylindrical support portion 27 of the support 23. As shown in FIGS. 3 and 4, an inner circumferential side washer 44 inserted into the upper guide pin 31 is disposed on both sides in the axial direction of the rubber ring 21. In the inner circumferential side washer 44, since an outer circumferential side washer 43 fixed to the inner circumferential surface of the upper cylindrical support portion 27 abuts on a surface opposite to a surface in contact with the rubber ring 21 in the inner circumferential inner washer 44, movement of the upper guide pin 31 along the axial direction is restricted. That is, the outer circumferential side washer 43 restricts the movement of the rubber ring 21 in a direction along the upper guide pin 31 via the inner circumferential side washer 44.

An alignment bearing 49 is fixed to a center of the inner circumferential surface of the upper cylindrical support portion 27 surrounding the upper guide pin 31 by a step portion 45 and a snap ring 47. The alignment bearing 49 swingably supports the upper guide pin 31. The alignment bearing 49 can bring a slide surface between the brake pad 17 and the disc rotor 27 into close contact at the time of braking even the wheel 35 elastically supported by the truck frame displaces (swings) relatively to the truck frame and the upper guide pin 31 is not parallel with the upper cylindrical support portion 27 of the support 23.

Incidentally, as shown in FIG. 2, a rubber bushing 52 and a sleeve 51 are interposed between the lower guide pin 33 and the lower cylindrical support portion 29. Instead of the alignment bearing 49, the lower guide pin 33 is slidably supported in an axis of the lower cylindrical support 29 through the rubber bushing 52 and the sleeve 51.

The pair of rubber rings 21 is disposed on both sides in the axial direction of the alignment bearing 49 on the inner circumferential surface of the upper cylindrical support portion 27. The pair of rubber rings 21 are slidably fitted into the upper cylindrical support portion 27 and elastically support the upper guide pin 31 in the radial direction.

The inner circumferential side washer 44 is disposed on both sides in the axial direction of the rubber ring 21 and restricts the inner circumferential portion of the rubber ring 21 from bending deformation along the axial direction of the upper guide pin 31. In the first embodiment, as shown in FIG. 3, each rubber ring 21 is restricted from moving to one side in the axial direction by a step portion 53 formed on the inner circumferential surface of the upper cylindrical support portion 27 through the inner circumferential side washer 44 and the outer circumferential side washer 43, and is restricted from moving to the other side in the axial direction by a snap ring 55. Accordingly, the pair of rubber rings 21 is fixed to the inner circumferential surface of the upper cylindrical support portion 27 when the movement in the axial direction is restricted.

The rubber ring 21 having a shape and material with a high elasticity region (deformation amount) is selected. In the first embodiment, a sectional shape of a surface including an axis of the rubber ring 21 is formed in a rectangular shape. As shown in FIG. 3, the inner circumferential surface side of the rubber ring 21 is in sliding contact with the outer circumferential surface of the upper guide pin 31.

The sectional shape of the rubber ring according to the present invention is not limited to a rectangular section of the rubber ring 21 in the first embodiment, but may adopt various shapes of section such as a U-shape or an H-shape including an annular groove where grease can be held on the inner circumferential surface. When the annular groove is provided on the inner circumferential surface of the rubber ring, a sliding resistance value between the inner circumferential surface of the rubber ring and the outer circumferential surface of the upper guide pin 31 is set to an appropriate value of 5 to 50 kgf, so it is possible to hold a high-performance grease mixed with a solidified lubricant such as molybdenum disulfide. An optimum combination of types of high-performance grease is selected while adjusting the presence of grease application.

Figure 12A:
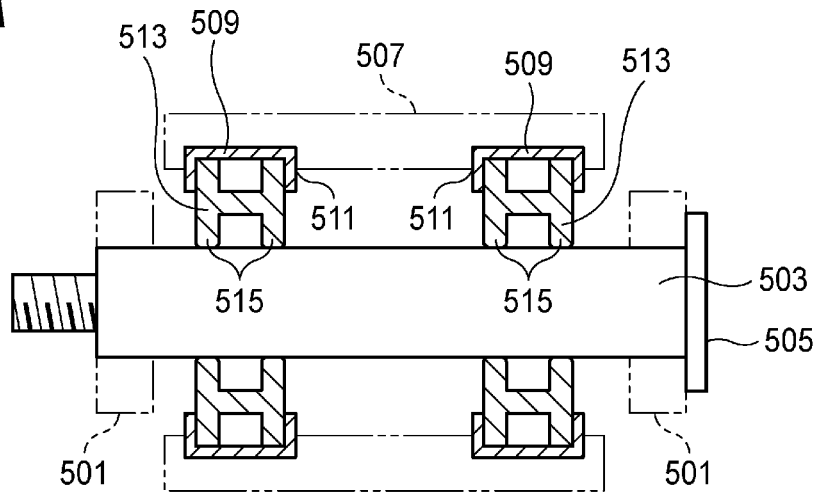
FIG. 12A is a schematic view showing a posture of a retraction rubber ring with respect to a guide pin at the time of non-braking in a conventional configuration.
Figure 12B:
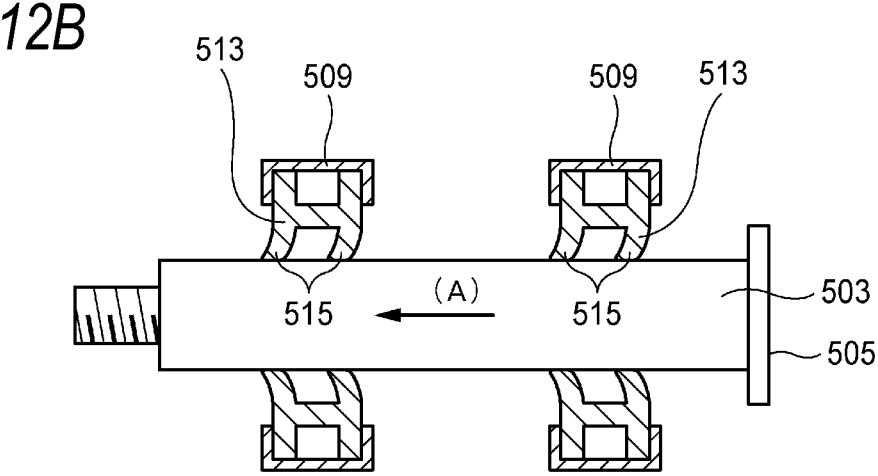
FIG. 12B is a schematic view showing deformation of a protrusion of the retraction rubber ring at the time of braking in FIG. 12A.
Figure 12C:
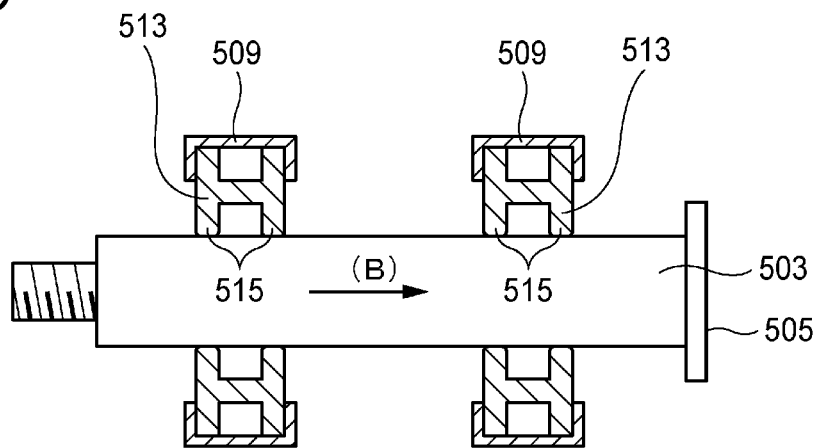
FIG. 12C is a schematic view showing operation when the retraction rubber ring is restored.

The inner circumferential portion of the rubber ring 21 is in sliding contact with the outer circumferential surface of the upper guide pin 31, and bending deformation of the inner circumferential portion along the axial direction of the upper guide pin 31 is restricted by the inner circumferential side washer 44 disposed on both sides in the axial direction of the rubber ring 21 and inserted into the upper guide pin 31. Therefore, in the rubber ring 21, as the conventional retraction rubber ring 513 (see FIG. 12B), the inner circumferential portion is not bent and deformed along the axial direction of the upper guide pin 31 due to movement of the upper guide pin 31 during braking, and the upper guide pin 31 is not moved in the axial direction by the elastic restoring force. The rubber ring 21 elastically supports the upper guide pin 31 only in the radial direction. Accordingly, for example, when the upper guide pin 31 moves toward the drive piston side with respect to the upper cylindrical support portion 27 during brake braking, when the brake is slowly released, the side opposite to the drive piston side (hereinafter referred to as an opposite drive piston side), the rubber ring 21 does not generate force that returns the upper guide pin 31 to the side opposite to the drive piston side (hereinafter referred to as an opposite drive piston side), and only the caliper return force of the caliper return mechanism 20 acts.

Here, in the disc brake 11 having the above configuration, a force relationship required for the caliper return force is as follows. That is, at the time of F1: sliding resistance of the upper guide pin 31 and the support 23 (the alignment bearing 49, the rubber ring 21), F2: spring force of a compression spring member 65, F3: sliding resistance of the lower guide pin 33 and the support 23 (sleeve 51), and F4: sliding resistance of the slide bearing 61 at both end portions of the upper guide pin 31, a force relationship of F1>F2>(F3+F4) is set.

Next, the operation of the disc brake 11 having the above-described configuration will be described.

In the floating caliper type disc brake 11 according to the first embodiment, when the drive piston 15 provided at the tip end portion of the piston side pressing arm 39 is driven, the brake pad 17 on one side (left side in FIG. 5A) is pressed against the disc rotor 37. As a result, the brake pad 17 on one side receives reaction force from the disc rotor 37.

The reaction force received by the brake pad 17 on one side moves the piston side pressing arm 39 in a direction away from the disc rotor 37 (left side in FIG. 5A).

By this movement, as shown in FIG. 5B, in the floating caliper 13, the base portion 25 on a side of the opposite piston side pressing arm 41 moves in a direction in which the spring receiving member 63 on the opposite drive piston side (right side in FIG. 5B) approaches the disc rotor 37 (left direction in FIG. 5B), and the base portion 25 on a side of the piston side pressing arm 39 moves in a direction (left direction in FIG. 5B) in which the spring receiving member 66 on the drive piston side (left side in FIG. 5B) is separated from the disc rotor 37.

By movement of the floating caliper 13, the compression spring member 65 housed in the spring housing member 59 of the spring receiving member 63 on the opposite drive piston side is compressed and deformed. As a result, the caliper return force is accumulated in the caliper return mechanism 22 disposed on the opposite drive piston side. During compression of the compression spring member 65, the spring receiving member 63 moves the outer circumference of the upper guide pin 31 in a direction along the axis with reduced sliding resistance by the slide bearing 61. By movement of the spring receiving member 63, as shown in FIG. 5B, the spring support portion 72 on the opposite drive piston side abuts against the opening end flange 57 locked to the opposite piston side end opening portion 32 (see FIG. 3) of the upper stage guide pin 31.

By movement of the floating caliper 13, the piston side pressing arm 39 moves the spring receiving member 66 on the drive piston side in a direction away from the disc rotor 37. Then, the spring housing member 59 on the drive piston side is moved in a direction in which the opening end flange 57 is pressed against the stopper portion 85 of the spring receiving member 66 and pulled out from the spring housing portion 69 of the upper guide pin 31. Thereby, a gap (interference avoidance gap) S2 is formed between the opening end flange 57 and the piston side end opening 38 (see FIG. 3) of the upper guide pin 31. Further, the opening end flange 57 is kept in contact with the stopper portion 85 by biasing force of the compression spring member 65 and is disposed in a state of being separated from the spring support portion 68, so that a spring force of the compression spring member 65 on the drive piston side does not affect the compression deformation of the compression spring member 65 on the opposite drive piston side. The above is a state during brake braking.

On the other hand, after the brake is slowly released, the drive piston 15 retreats. Then, reaction force in a direction away from the disc rotor 37 does not act on the piston side pressing arm 39. Therefore, the compression spring member 65 that has been deformed by compression on the opposite piston side pressing arm 41 is elastically restored. The elastically restored compression spring member 65 presses the spring support portion 72 in a direction away from the opening end flange 57. Due to the elastic restoring force, the spring receiving member 63 on the opposite drive piston side moves in a direction (right direction in FIG. 5B) away from the disc rotor 37 by the slide bearing 61. The spring receiving member 63 on the opposite drive piston side moves the opposite piston side pressing arm 41 in a direction away from the disc rotor 37. As a result, as shown in FIG. 5C, the floating caliper 13 returns to a state before braking (initial time), and a pair of brake pads 17 is separated from the disc rotor 37 separately with the same clearance as before braking.

When the brake is slowly released, the piston side pressing arm 39 moves the spring receiving member 66 on the drive piston side in a direction approaching the disc rotor 37. The interference avoidance gap S2 is formed between the opening end flange 57 and the piston side end opening portion 38 of the upper guide pin 31. Therefore, elastic force of the compression spring member 65 on the drive piston side does not act as reaction force (load) against the caliper return force.

Here, as shown in FIG. 5A, a clearance d between each brake pad 17 and the disc rotor 37 is set to 3 mm before braking (initial time). At the time of brake braking shown in FIG. 5B, the drive piston 15 projects by 6 mm (piston stroke s=6 mm), so that the base portion 25 moves conversely to a projection direction of the drive piston 15 by 3 mm due to the reaction force. At this time, since the upper guide pin 31 does not move and the caliper return mechanism 22 moves, the compression spring member 65 on the opposite drive piston side is compressed and deformed. Restoring force due to the deformation of the compression spring member 65 generates force (retraction effect) that returns the floating caliper 13. Therefore, after slow release of the brake shown in FIG. 5C, simultaneously with 6 mm pulling back of the drive piston 15, the floating caliper 13 moves 3 mm toward the opposite piston side, and both pad clearances are 3 mm. When lining wear occurs, after slow release of the brake, a deviation amount between the support 23 and the upper guide pin 31 appears.

Next, operation of the disc brake 11 having the above configuration at the time of wheel swinging will be described.

In a railway vehicle, the wheel 35 swings with respect to the floating caliper 13 fixed to the truck frame during braking at the time of curve travel.

In the disc brake 11 having the above configuration, clearances of both brake pads 17 are maintained at the same value if a wheel swinging amount is up to twice of the pad clearance and even after the wheel swinging.

In the floating caliper type disc brake 11 of the first embodiment, it is possible to secure both pad clearances of 3 mm to a wheel swinging amount of +6 mm. When the wheel swinging amount exceeds 9 mm, the compressive deformation of the compression spring member 65 on the drive piston side generates pressing force of the brake pad 17 against the disc rotor 37.

That is, when the disc brake 11 is initialized, if the wheel 35 swings 6 mm in a direction of the drive piston from the initial time, a deviation amount between the support 23 and the base portion 25 becomes 3 mm, and a deviation amount between the wheel 35 and the base portion 25 becomes 3 mm. In this case, return force of 3 mm is generated in the caliper return mechanism 20 on the drive piston side. If the swinging is canceled, the disc brake 11 can secure both pad clearances of 3 mm.

In addition, when the disc brake 11 is initialized, if the wheel 35 swings 10 mm in a direction of the drive piston from the initial time, a deviation amount between the support 23 and the base portion 25 becomes 7 mm, and a deviation amount between the wheel 35 and the base portion 25 becomes 3 mm.

Therefore, when the wheel return amount is 6 mm, the deviation amount between the support 23 and the base portion 25 is 4 mm, and the deviation amount between the wheel 35 and the base portion 25 is 0 mm. The pad clearance between the disc rotor 37 and the brake pad 17 is 3 mm.

In addition, when the wheel return amount is 9 mm, the deviation amount between the support 23 and the base portion 25 is 4 mm, and the deviation amount between the wheel 35 and the base portion 25 is 0 mm. Further, a remaining movement amount of the wheel 35 becomes 1 mm, and the disc rotor 37 abuts against the brake pad 17. When the wheel 35 moves by the remaining movement amount of 1 mm, the compression spring member 65 on the drive piston side bends, and the pressing force of the brake pad 17 against the disc rotor 37 is generated.

As shown in FIG. 5A, in the floating caliper type disc brake 11 according to the first embodiment, caliper return mechanisms 20, 22 are provided at both end portions of the upper guide pin 31 that slidably supports the base portion 25 of the floating caliper 13 with respect to the upper cylindrical support portion 27 of the support 23. The caliper return mechanism 22 on the opposite drive piston side generates caliper return force between the upper guide pin 31 and the floating caliper 13. Therefore, the caliper return mechanism 22 on the opposite drive piston side separates the pair of brake pads 17 from the disc rotor 37 with the same clearance as before braking by the caliper return force when braking is released. The upper guide pin 31 provided with the caliper return mechanisms 20, 22 only need to be exchanged with the upper guide pin in the current floating caliper, and an improvement can be made to realize a pad dragging measure against the floating caliper type disc brake without any additional processing on the existing floating caliper.

Further, the inner circumferential portion of the rubber ring 21 fitted in the upper cylindrical support portion 27 and elastically supporting the upper guide pin 31 in the radial direction is restricted from bending deformation along the axial direction of the upper guide pin 31 by the inner circumferential side washer 44 disposed on both sides in the axial direction of the rubber ring 21 and inserted into the upper guide pin 31. Therefore, as the conventional retraction rubber ring 513 (see FIG. 12B), the inner circumferential portion of the rubber ring 21 is not bent and deformed along the axial direction of the upper guide pin 31 due to movement of the upper guide pin 31 during braking, and the upper guide pin 31 is not moved in the axial direction by the elastic restoring force.

Therefore, the caliper returning mechanisms 20, 22 can stably generate the caliper return force without being affected by variation of friction resistance of the rubber ring 21 elastically supporting the upper guide pin 31 in the radial direction.

Further, in the floating caliper type disc brake 11 of this embodiment, the inner circumferential side washer 44 inserted into the upper guide pin 31 is positioned by the outer circumferential side washer 43 fixed to the inner circumferential surface of the upper cylindrical support portion 27 with respect to the axial direction of the upper guide pin 31. The inner circumferential side washer 44 inserted into the guide pin 31 has a clearance on the inner circumferential surface of the upper cylindrical support portion 27, and the outer circumferential side washer 43 fixed to the inner circumferential surface of the upper cylindrical support portion 27 has a clearance on the outer circumferential surface of the guide pin 31. Therefore, the inner circumferential side washer 44 positioned in the axial direction by the outer circumferential side washer 43 can follow movement of the upper guide pin 31 in the radial direction since slip occurs at a surface contact portion with the outer circumferential side washer 43.

Furthermore, in the floating caliper type disc brake 11 of the first embodiment, since the caliper return mechanisms 20, 22 are disposed at both end portions of the upper guide pin 31, it is possible to generate force that returns the base portion 25 of the floating caliper 13 to the opposite drive piston side, which is required when the wheel 35, for example, swings. Since the inner circumferential side washer 44 of the first embodiment is disposed on both sides in the axial direction of the rubber ring 21, not only bending deformation of the rubber ring 21 due to movement of the upper guide pin 31 during braking, but the bending deformation of the rubber ring 21 due to movement of the upper guide pin 31 in an opposite direction when the floating caliper 13 is moved due to swinging of the wheel 35 can also be restricted.

Therefore, even when the floating caliper 13 is moved to the opposite drive piston side by the swinging of the wheel 35, the rubber ring 21 does not generate force that returns the upper guide pin 31 to the drive piston side, and only the caliper return force of the caliper return mechanism 22 acts.

At the time of braking, when the drive piston 15 is driven and the floating caliper 13 is moved on the drive piston side with respect to the upper guide pin 31, the compression spring member 65 in the caliper return mechanism 22 provided at an end portion of the upper guide pin 31 on the opposite drive piston side is compressed to generate the caliper return force. At this time, since the movement of the spring housing member 59 in the caliper returning mechanism 20 disposed at the end portion of the upper guide pin 31 on the drive piston side is restricted in a predetermined interval S1 by the stopper portion 85 of the spring receiving member 66, a clearance (interference avoidance clearance) S2 is formed between the opening end flange 57 of the spring housing member 59 in the caliper return mechanism 20 on the drive piston side and the piston side end opening end portion 38 of the upper guide pin 31 due to the movement of the floating caliper 13 to the drive piston side. Therefore, the elastic force of the compression spring member 65 in the caliper return mechanism 20 on the drive piston side does not interfere with the caliper return force of the compression spring member 65 in the caliper return mechanism 22 on the opposite drive piston side, and the reaction force (load) against the caliper return force does not act.

In the disc brake for a railway vehicle according to the first embodiment, by providing the above-described configuration of the disc brake 11, when the brake pad 17 is pressed against the disc rotor 37 attached to both side surfaces of the wheel 35 for a railway vehicle to brake, a pad clearance between the brake pad 17 and the disc rotor 37 can be kept constant. As a result, uneven wear and dragging of the brake pad 17 can be prevented, and an increase in starting torque of the vehicle can be suppressed.

Next, a floating caliper type disc brake 111 according to a second embodiment of the present invention will be described.

In the floating caliper type disc brake 111 according to the second embodiment, the same reference numerals are given to members equal to the floating caliper type disc brake 11 according to the first embodiment, and repeated description is omitted.

Figure 6:
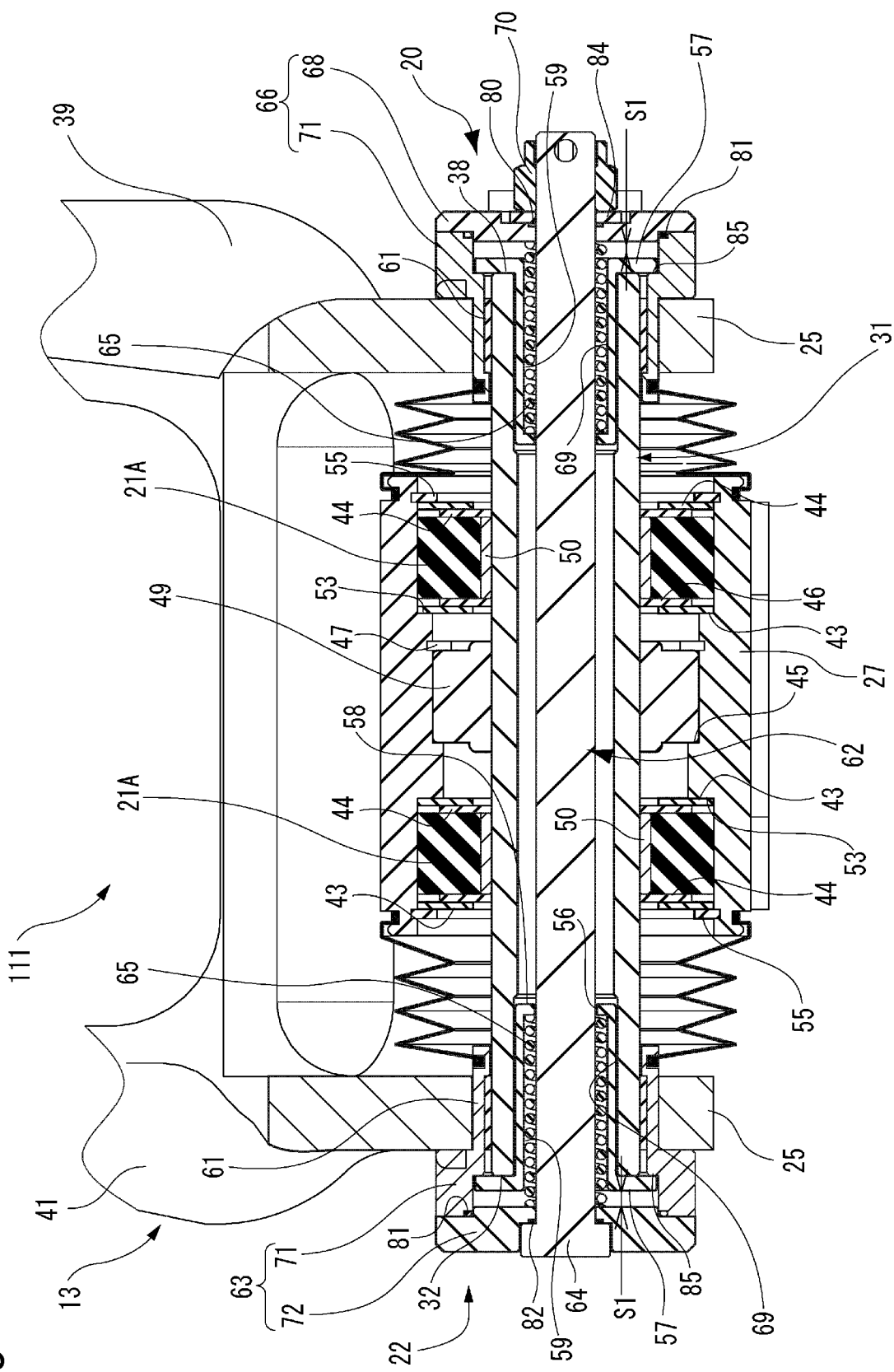
FIG. 6 is a horizontal cross-sectional view of main portions of a disc brake according to a second embodiment of the present invention.
Figure 7:
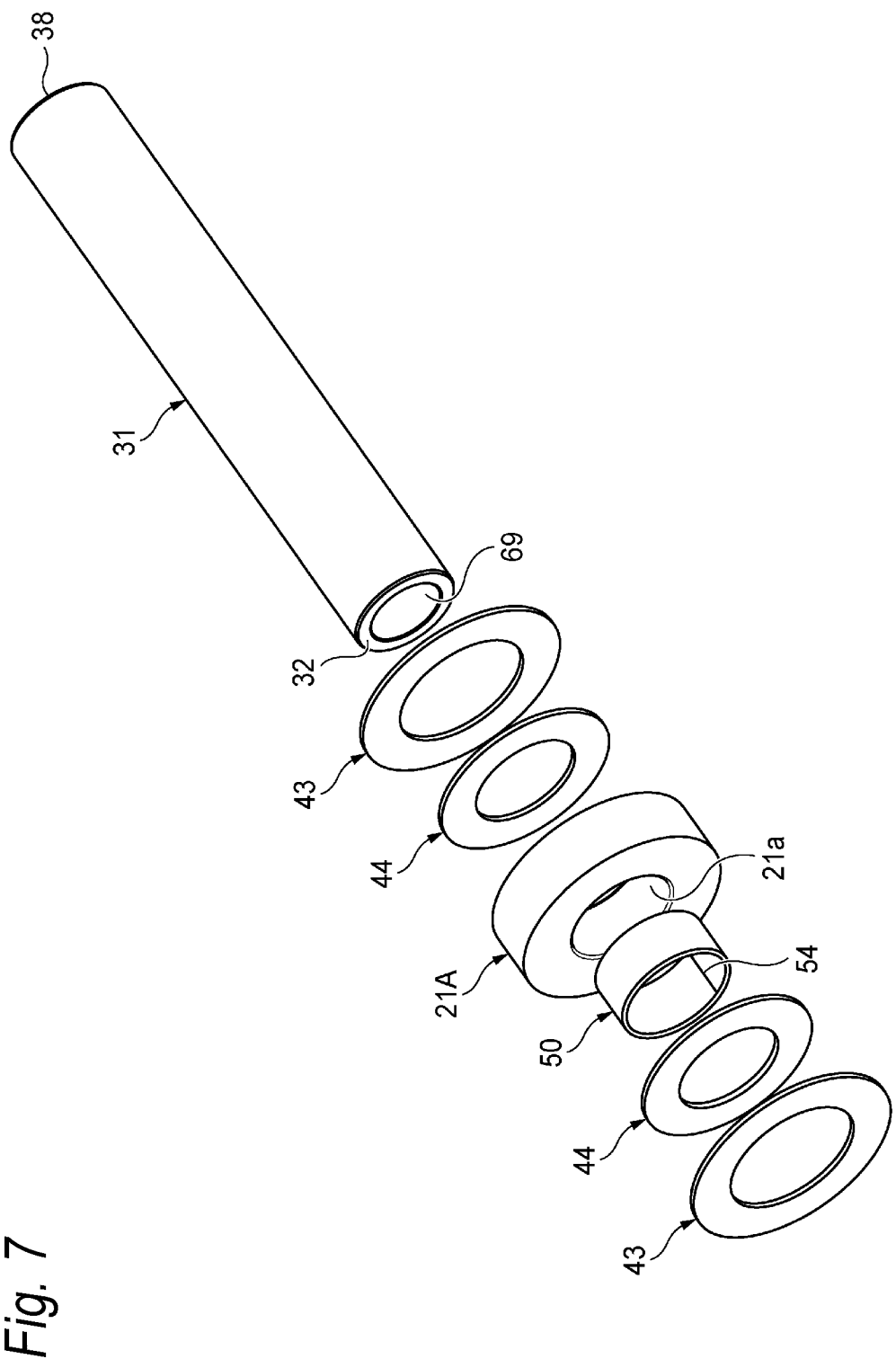
FIG. 7 is an exploded perspective view of an inner circumferential side washer and a rubber ring inserted into a guide pin shown in FIG. 6.

As shown in FIGS. 6 and 7, in the floating caliper type disc brake 111 according to the second embodiment, a fitting member 50 interposed between the upper guide pins 31 is disposed on the inner circumferential surface 21a of the rubber ring 21A fitted inside the upper cylindrical support portion 27.

The fitting member 50 is a cylindrical member made of metal or resin and has a slot 54. Then, the fitting member 50 is inserted along the inner circumferential surface 21a of the rubber ring 21A in a state of being elastically deformed in the diameter reduction direction. Therefore, the fitting member 50 inserted into the inner circumferential surface 21a of the rubber ring 21A can be fitted with the upper guide pin 31 with interference.

Therefore, according to the floating caliper type disc brake 111 according to the second embodiment, since the fitting member 50 is interposed between the inner circumferential surface 21a of the rubber ring 21A and the upper guide pin 31, sliding resistance of the upper guide pin 31 with respect to the rubber ring 21A is stable, the width of the axial force fluctuation decreases when the upper guide pin 31 slides, and the caliper return force of the caliper return mechanism 20, 22 becomes stable. Furthermore, since the fitting member 50 inserted into the inner circumferential surface 21a of the rubber ring 21A can be fitted with the upper guide pin 31 with interference, the sliding resistance of the upper guide pin 31 against the rubber ring 21A is more stable.

Next, a floating caliper disc brake 211 according to a third embodiment of the present invention will be described.

In the floating caliper type disc brake 211 according to the third embodiment, the same reference numerals are given to members equal to the floating caliper type disc brake 11 according to the first embodiment, and repeated description is omitted.

Figure 8:
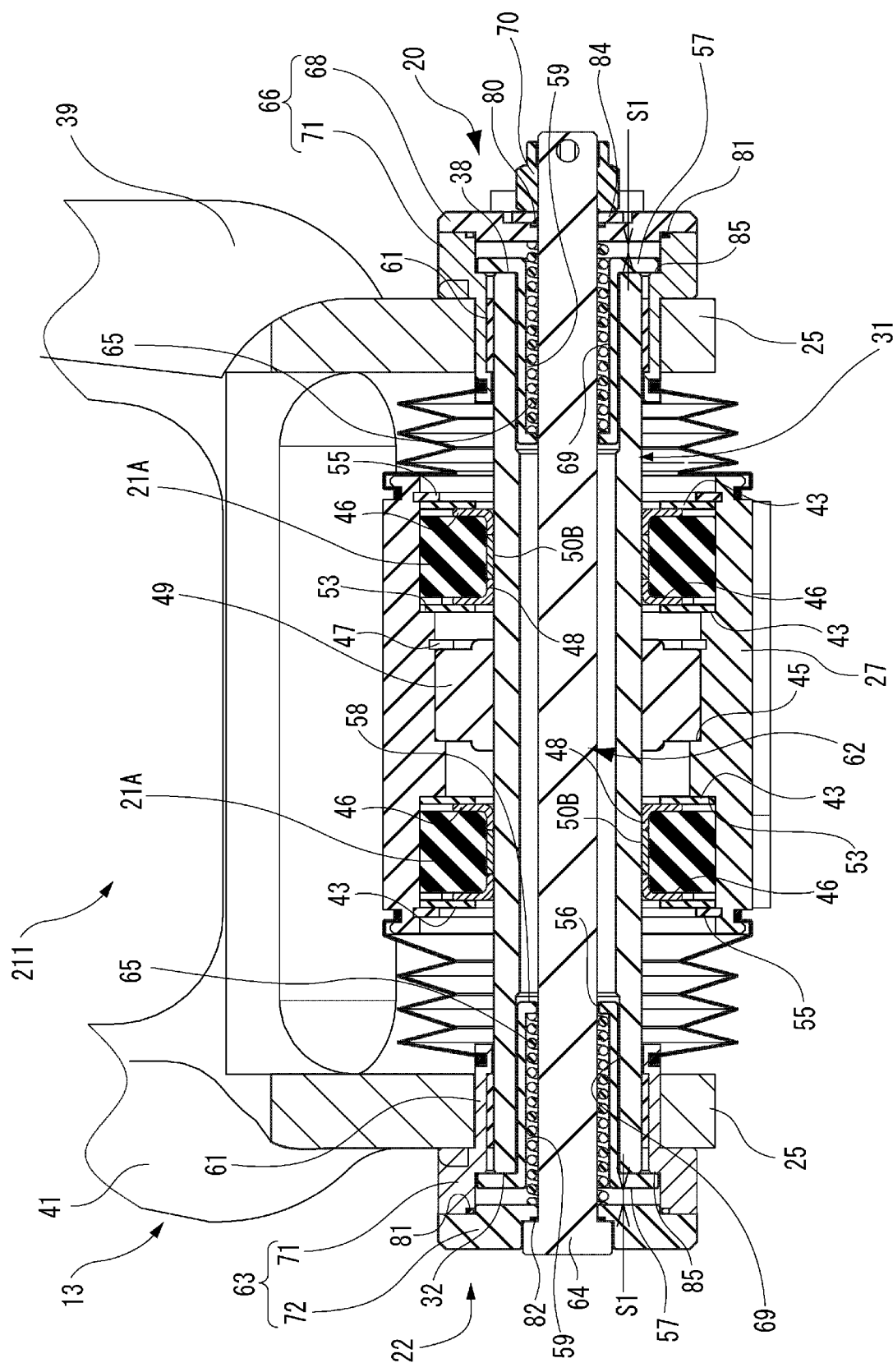
FIG. 8 is a horizontal cross-sectional view of main portions of a disc brake according to a third embodiment of the present invention.
Figure 9:
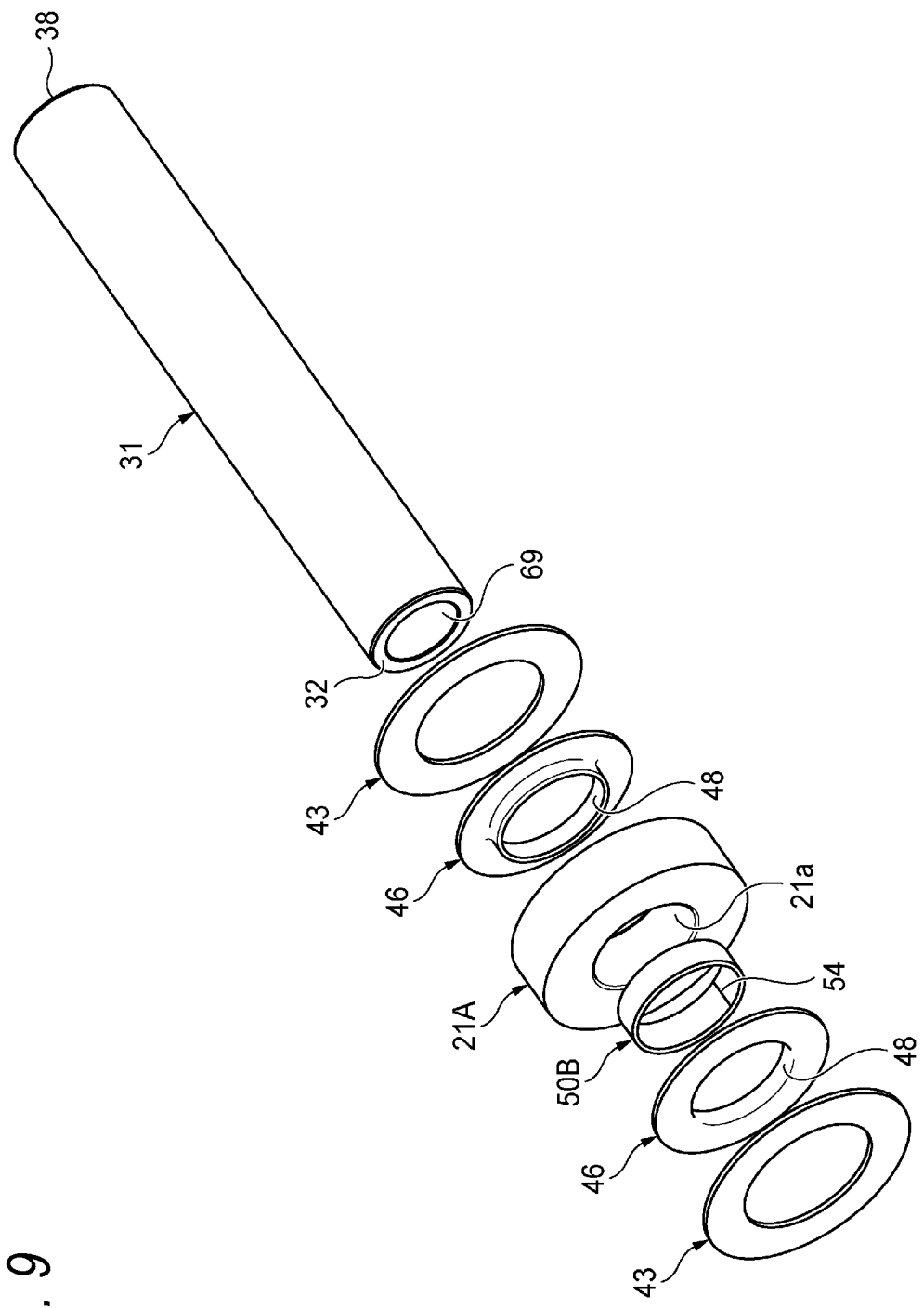
FIG. 9 is an exploded perspective view of an inner circumferential side washer and a rubber ring inserted into a guide pin shown in FIG. 8.

As shown in FIGS. 8 and 9, in the floating caliper type disc brake 211 according to the third embodiment, a fitting member 50B interposed between the upper guide pins 31 is disposed on the inner circumferential surface 21a of the rubber ring 21A fitted inside the upper cylindrical support portion 27. The inner circumferential end of the inner circumferential side washer 46 has a cylindrical extension portion 48 extending along the inner circumferential surface 21a of the rubber ring 21A.

The fitting member 50B is a cylindrical member made of metal or resin and has a slot 54. The fitting member 50B is inserted along the inner circumferential surface 21a of the rubber ring 21A in a state of being elastically deformed in the diameter reduction direction. Therefore, the fitting member 50B inserted into the inner circumferential surface 21a of the rubber ring 21A can be fitted with the upper guide pin 31 with interference.

In addition, the inner circumferential side washer 46 is formed with a cylindrical extension portion 48 by bending an inner circumferential end of the annular inner circumferential side washer into an L-shaped cross section by burring or the like.

Therefore, the pair of inner circumferential side washers 46 is fitted to the inner circumferential surface 21a of the rubber ring 21A such that the extension portion 48 interposes the fitting member 50B inserted into the rubber ring 21A between both opening end sides. That is, the inner circumferential side washer 46 and the fitting member 50B are fitted to the inner circumferential surface 21a of the rubber ring 21A by the extension portion 48 and are positioned in advance. Therefore, it is unnecessary to position the upper guide pin 31 when assembled to the upper cylindrical support portion 27 of the support 23, and the assembly is good.

In addition, since the opening edge of the inner circumferential side washer 46 has an R portion where an entrance is not an edge by the cylindrical extension portion 48 and is bent, when the inner circumferential side washer 46 is inserted into the upper guide pin 31, the upper guide pin 31 can be inserted smoothly without being caught by the inner circumferential side washer 46.

Next, a floating caliper disc brake 311 according to a fourth embodiment of the present invention will be described.

In the floating caliper type disc brake 311 according to the fourth embodiment, the same reference numerals are given to members equal to the floating caliper type disc brake 11 according to the first embodiment, and repeated description is omitted.

Figure 10:
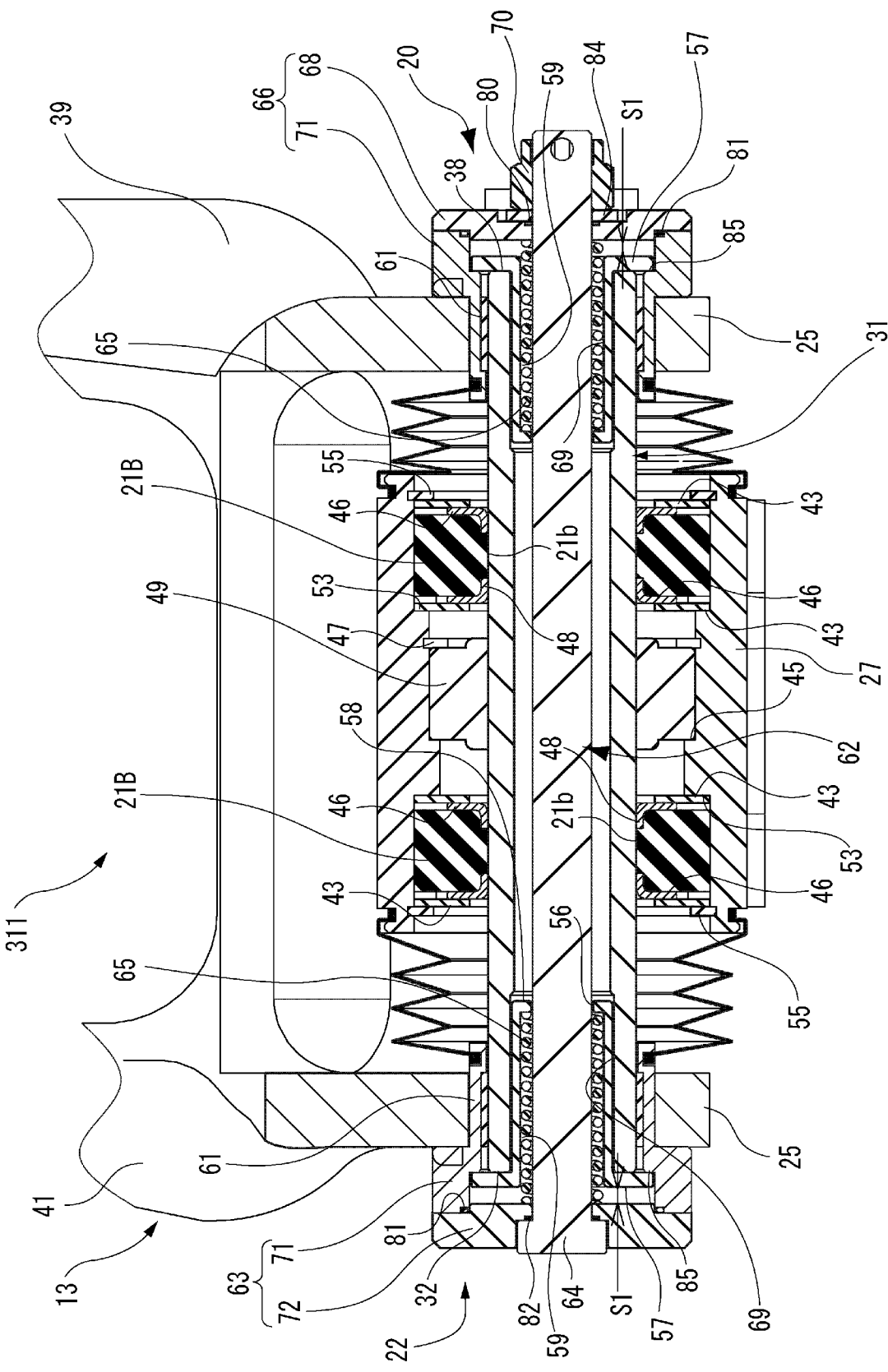
FIG. 10 is a horizontal cross-sectional view of main portions of a disc brake according to a fourth embodiment of the present invention.
Figure 11:
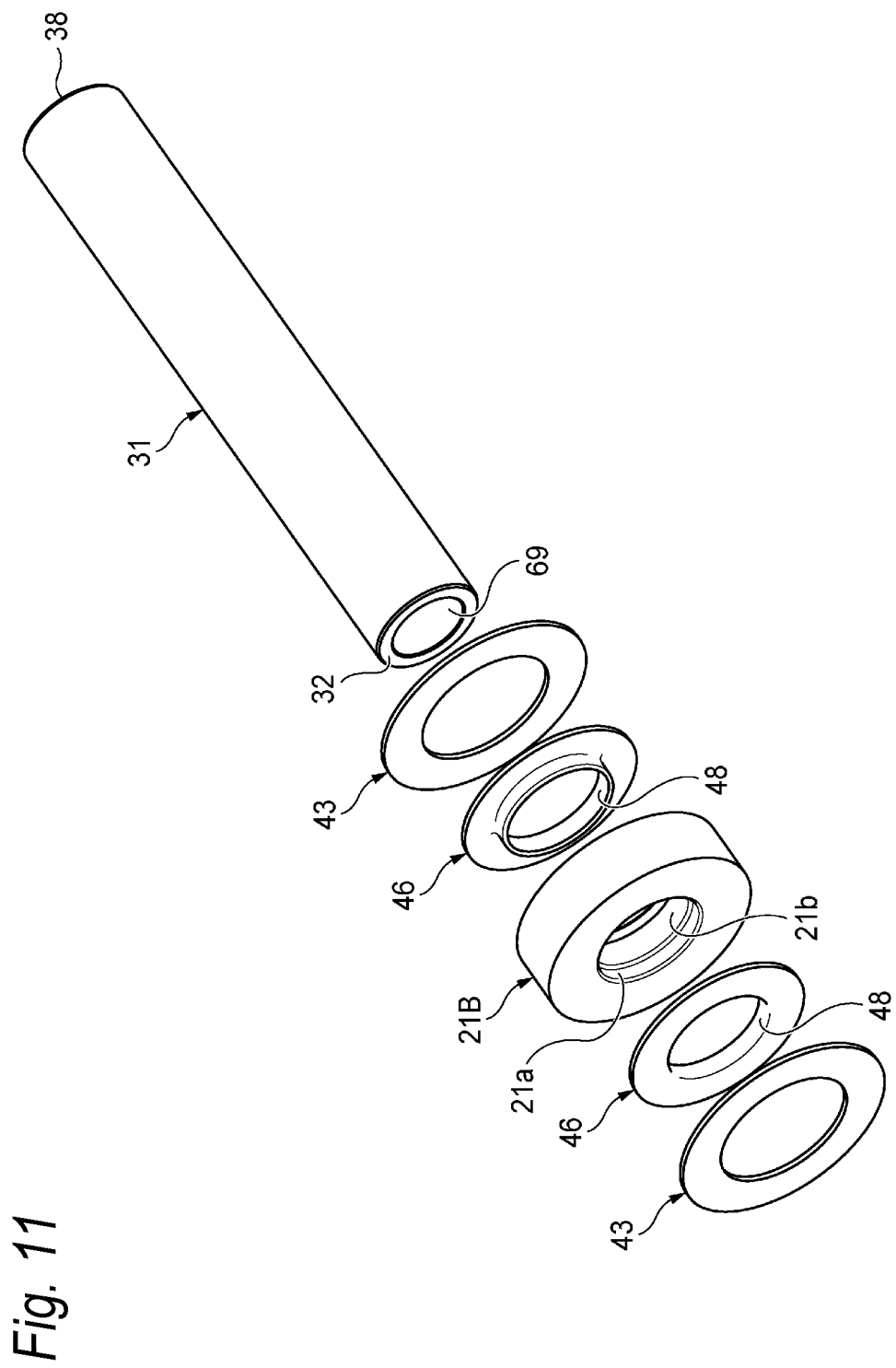
FIG. 11 is an exploded perspective view of an inner circumferential side washer and a rubber ring inserted into a guide pin shown in FIG. 10.

As shown in FIGS. 10 and 11, in the floating caliper type disc brake 311 according to the fourth embodiment, the rubber ring 21B fitted inside the upper cylindrical support portion 27 and the inner circumferential side washer 46 disposed on both sides in the axial direction of the rubber ring 21B are provided.

The rubber ring 21B has an annular protrusion 21b protrudingly provided at an axial center portion of the inner circumferential surface 21a. The inner circumferential side washer 46 has a cylindrical extension portion 48 whose inner circumferential end extends along the inner circumferential surface 21a of the rubber ring 21B.

Therefore, the pair of inner circumferential side washers 46 is fitted to the inner circumferential surface 21a of the rubber ring 21B such that the extension portion 48 interposes the annular protrusion 21b of the rubber ring 21B between both opening end sides. That is, the inner circumferential side washer 46 is fitted to the inner circumferential surface 21a of the rubber ring 21B by the extension portion 48 and is positioned in advance. Therefore, it is unnecessary to position the upper guide pin 31 when assembled to the upper cylindrical support portion 27 of the support 23, and the assembly is good.

In addition, since the opening edge of the inner circumferential side washer 46 has an R portion where an entrance is not an edge by the cylindrical extension portion 48 and is bent, when the inner circumferential side washer 46 is inserted into the upper guide pin 31, the upper guide pin 31 can be inserted smoothly without being caught by the inner circumferential side washer 46.

Therefore, according to the floating caliper type disc brakes 11, 111, 211, 311 and the disc brake for a railway vehicle according to the first to fourth embodiments, the caliper return force is set easily, and desired caliper return operation is exhibited stably, so that dragging of the brake pad 17 can be prevented certainly.

Here, characteristics of embodiments of the disc brake and disc brake for a railway vehicle according to the present invention described above are briefly summarized and listed below, respectively.

[1] A disc brake (11) including:

a floating caliper (13) including a base portion (25) which is slidably supported to a cylindrical support portion (an upper cylindrical support portion 27 and a lower cylindrical support portion 29) of a support (23) by a guide pin (an upper guide pin 31) and a pair of pressing arms (a piston side pressing arm 39 and an opposite piston side pressing arm 41) which are extended from the base portion to a position where a disc rotor (37) is interposed between both sides in an axial direction;

a pair of brake pads (17) provided at tip end portions of the pair of pressing arms respectively so as to face side surfaces of the disc rotor;

a drive piston (15) provided on one of the pair of pressing arms to drive one of the brake pads toward the side surface of the disc rotor;

caliper return mechanisms (20, 22) disposed on at least an end portion on a side opposite to the drive piston side at two end portions of the guide pin, and configured to elastically bias the base portion slidably supported by the guide pin toward the side opposite to the drive piston side;

a rubber ring (21) fitted inside the cylindrical support portion and elastically supporting the guide pin in a radial direction; and an inner circumferential side washer (44) disposed on at least the drive piston side on both sides of the rubber ring in an axial direction and inserted into the guide pin so as to restrict an inner circumferential portion of the rubber ring from bending deformation along an axial direction of the guide pin.

[2] The disc brake according to the above [1], wherein an outer circumferential side washer (43) fixed to an inner circumferential surface of the cylindrical support portion (the upper cylindrical support portion 27 and the lower cylindrical support portion 29) abuts on a surface opposite to a surface of the inner circumferential side washer which is in contact with the rubber ring, so as to restrict movement of the inner circumferential side washer along the axial direction of the guide pin.

[3] The disc brake according to the above [1] or [2], wherein
an inner circumferential end of the inner circumferential side washer includes a cylindrical extension portion extending along an inner circumferential surface of the rubber ring.
[4] The disc brake according to any one of the above [1] to [3], wherein
a fitting member interposed between the guide pins is disposed in the inner circumferential surface of the rubber ring.
[5] The disc brake according to the above [4], wherein
the fitting member is a cylindrical member including a slot, and is fitted along the inner circumferential surface of the rubber ring in a state of being elastically deformed in a diameter reduction direction.
[6] The disc brake according to any one of the above [1] to [5], wherein
the inner circumferential side washer is disposed on both sides of the rubber ring in the axial direction.
[7] A disc brake for a railway vehicle including the disc brake according to any one of the above [1] to [6].

Incidentally, the present invention is not limited to the above-described embodiments and may be appropriately modified, improved, or the like. Besides, materials, shapes, dimensions, numbers, arrangement places, or the like of the constituent elements in the above-described embodiments are arbitrary and not limited as long as the present invention can be achieved.

In addition, the present application is based on Japanese Patent Application No. 2016-068673 applied on Mar. 30, 2016, contents of which are incorporated herein as reference.

INDUSTRIAL APPLICABILITY

According, to the disc brake and the disc brake for a railway vehicle of the present invention, caliper return force is set easily, and desired caliper return operation is exhibited stably, so that dragging of a pad can be prevented certainly. Therefore, it is possible to provide a favorable disc brake and a favorable disc brake for a railway vehicle that can prevent an increase in a starting torque and prevent wear of a lining.

DESCRIPTION OF REFERENCE NUMERALS

11: disc brake
13: floating caliper
15: drive piston
17: brake pad
20, 22: caliper return mechanism
21: rubber ring
23: support
25: base portion
27: upper cylindrical support portion (cylindrical support portion)
29: lower cylindrical support portion (cylindrical support portion)
31: upper guide pin (guide pin)
32: opposite piston side end opening portion (end portion)
37: disc rotor
32: piston side end opening portion (end portion)
40: piston side pressing arm (pressing arm)
41: opposite piston side pressing arm (pressing arm)
43: outer circumferential side washer
44: inner circumferential side washer
57: opening end flange
58: bottom portion
59: spring housing member
61: slide bearing
63, 66: spring receiving member
65: compression spring member
68, 72: spring support portion
69: spring housing portion
71: guide pin support portion
80, 81, 82: O ring
85: stopper portion

The invention claimed is:
1. A disc brake comprising:
a floating caliper including a base portion which is slidably supported to a cylindrical support portion of a support by a guide pin and a pair of pressing arms which are extended from the base portion to a position where a disc rotor is interposed between both sides in an axial direction of the guide pin;
a pair of brake pads provided at tip end portions of the pair of pressing arms respectively so as to face a side surface of the disc rotor;
a drive piston provided on one of the pair of pressing arms to drive one of the brake pads toward the side surface of the disc rotor;
a caliper return mechanism, disposed on at least an end portion on a side opposite to the drive piston side at two end portions of the guide pin, and configured to elastically bias the base portion slidably supported by the guide pin toward the side opposite to the drive piston side;
a rubber ring fitted inside the cylindrical support portion and elastically supporting the guide pin in a radial direction of the guide pin; and
an inner circumferential side washer disposed on at least the drive piston side of both sides of the rubber ring in the axial direction and inserted into the guide pin, so as to restrict an inner circumferential portion of the rubber ring from bending deformation along the axial direction of the guide pin.
2. The disc brake according to claim 1, wherein
an outer circumferential side washer fixed to an inner circumferential surface of the cylindrical support portion abuts on a surface opposite to a surface of the inner circumferential side washer which is in contact with the rubber ring, so as to restrict movement of the inner circumferential side washer along the axial direction of the guide pin.
3. The disc brake according to claim 1, wherein
an inner circumferential end of the inner circumferential side washer includes a cylindrical extension portion extending along an inner circumferential surface of the rubber ring.
4. The disc brake according to claim 1, wherein
a fitting member interposed between the guide pins is disposed on the inner circumferential surface of the rubber ring.
5. The disc brake according to claim 4, wherein
the fitting member is a cylindrical member including a slot, and is fitted along the inner circumferential surface of the rubber ring in a state of being elastically deformed so as to reduce a diameter of the fitting member.
6. The disc brake according to claim 1, wherein
the inner circumferential side washer is disposed on both sides of the rubber ring in the axial direction.

7. A disc brake for a railway vehicle comprising the disc brake according to claim 1.

\* \* \* \* \*